INVENTOR.
GEORGE R. ASCHAUER
BY James E. Nilles
ATTORNEY

Aug. 26, 1969    G. R. ASCHAUER    3,463,281
COMBINATION FRICTION CLUTCH AND FLUID COUPLING
Filed Oct. 24, 1967    4 Sheets-Sheet 2

INVENTOR.
GEORGE R. ASCHAUER
BY
James E. Nilles
ATTORNEY

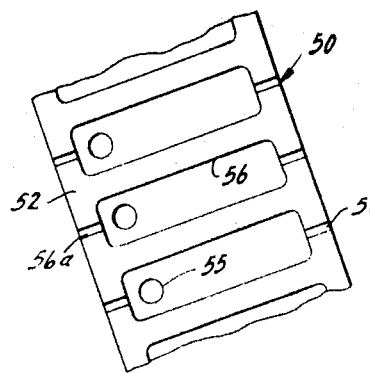
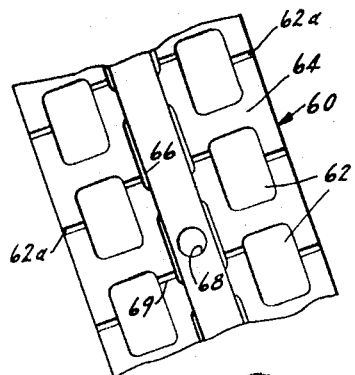
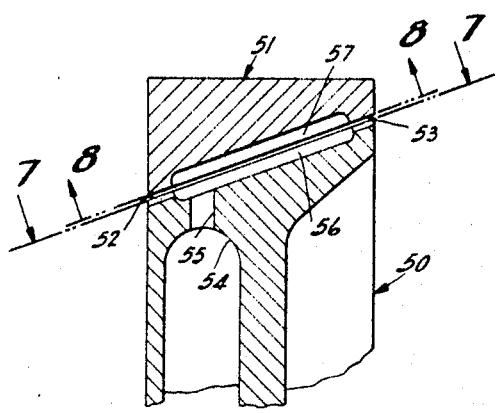
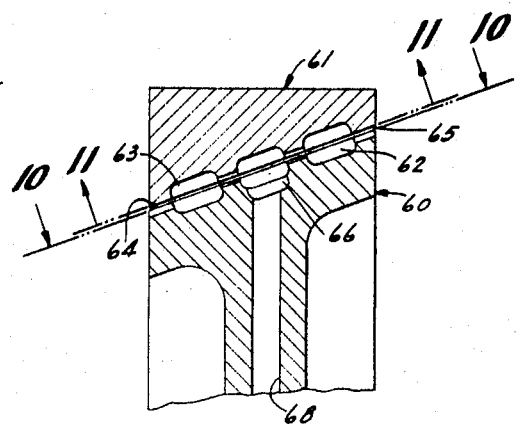
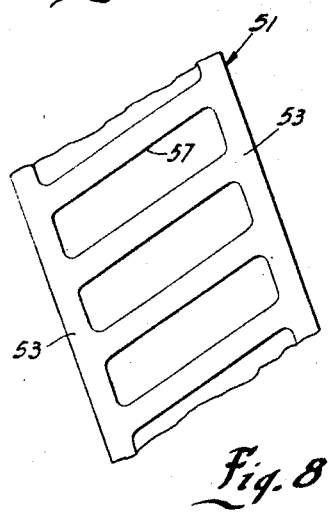
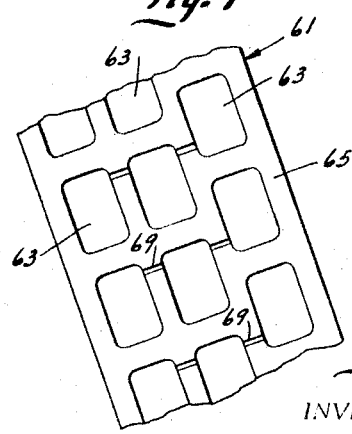
INVENTOR.
GEORGE R. ASCHAUER
BY James E. Nilles
ATTORNEY Aug. 26, 1969  G. R. ASCHAUER  3,463,281
COMBINATION FRICTION CLUTCH AND FLUID COUPLING
Filed Oct. 24, 1967  4 Sheets-Sheet 4

INVENTOR.
GEORGE R. ASCHAUER
BY
James E. Miller
ATTORNEY

United States Patent Office 3,463,281
Patented Aug. 26, 1969

3,463,281
COMBINATION FRICTION CLUTCH AND FLUID COUPLING
George R. Aschauer, Racine, Wis., assignor to Twin Disc Incorporated, Racine, Wis., a corporation of Wisconsin
Filed Oct. 24, 1967, Ser. No. 677,584
Int. Cl. F16d 31/00, 25/00, 51/08
U.S. Cl. 192—57     10 Claims

ABSTRACT OF THE DISCLOSURE

Power transmitting mechanism, such as clutches or brakes having interengaging friction plates, cones or other shaped faces which are abuttable together to cause a driving engagement therebetween. The engageable faces have opposed fluid pockets or recesses which are supplied with fluid that circulates between the faces of the opposed plates so as to act as a fluid coupling during the engaging period.

BACKGROUND OF THE INVENTION

Conventional friction clutches or brakes develop heat during the engaging period, which heat is absorbed in great measure by the metal of the engaging parts, and cooling oil flowing over the faces of the clutch for dissipating the heat has been used with success. An example of this prior art is shown in my U.S. Patent No. 3,063,531 issued Nov. 13, 1962, entitled "Friction Plate Clutch," wherein grooves are formed in the faces for conducting this cooling fluid over the faces of high speed clutches.

Fluid couplings, per se, are also well known wherein torque is transmitted through the fluid, and the heat generated is absorbed primarily by the fluid. An example of such fluid coupling transmission employing hydrokinetic action is my U.S. Patent No. 3,247,936, issued Apr. 26, 1966, and entitled "Fluid Coupling With Dump Valve." Such couplings are not as positive in locking the rotating elements together as are the "asperity" type, torque transmitting devices such as friction or tooth clutches.

SUMMARY OF THE INVENTION

A power transmitting mechanism having engageable friction clutch faces which also define fluid recesses or pockets through which fluid is forced during engagement of the mechanism whereby a sufficient fluid pumping or coupling action is initially present with its hydrokinetic characteristics to carry the load and where the heat is absorbed by the fluid during the period of high slip. In other words, the difference in speed between the faces containing the pockets causes the necessary circulation or pumping action of the fluid. The friction faces then come into contact with one another and the power is transmitted more positively, finally going into "lock-up" of the drive and driven parts. Thus, during initial, slipping engagement, the heat of work being done goes into the fluid which can dissipate it effectively, and during the relatively short engaging period of the friction clutches faces, the heat is easily accommodated by the metal of the clutch elements until ultimate, positive drive is quickly attained.

BRIEF DESCRIPTION OF THE DRAWINGS

FIGURE 6 is a longitudinal, cross sectional view through a single cone-type clutch mechanism using the present invention with centrifugal force feed for the coupling fluid;

FIGURE 7 is a sectional view taken along line 7—7 in FIGURE 6;

FIGURE 8 is a sectional view taken along 8—8 in FIGURE 6;

FIGURE 9 is a longitudinal, cross sectional view through a cone-type clutch mechanism using the present invention with a forced, hydrostatic feed for the coupling fluid;

FIGURE 10 is a cross sectional view taken along the line 10—10 in FIGURE 9;

FIGURE 11 is a cross sectional view taken along line 11—11 in FIGURE 9;

DESCRIPTION OF THE PREFERRED EMBODIMENT

Figure 1:
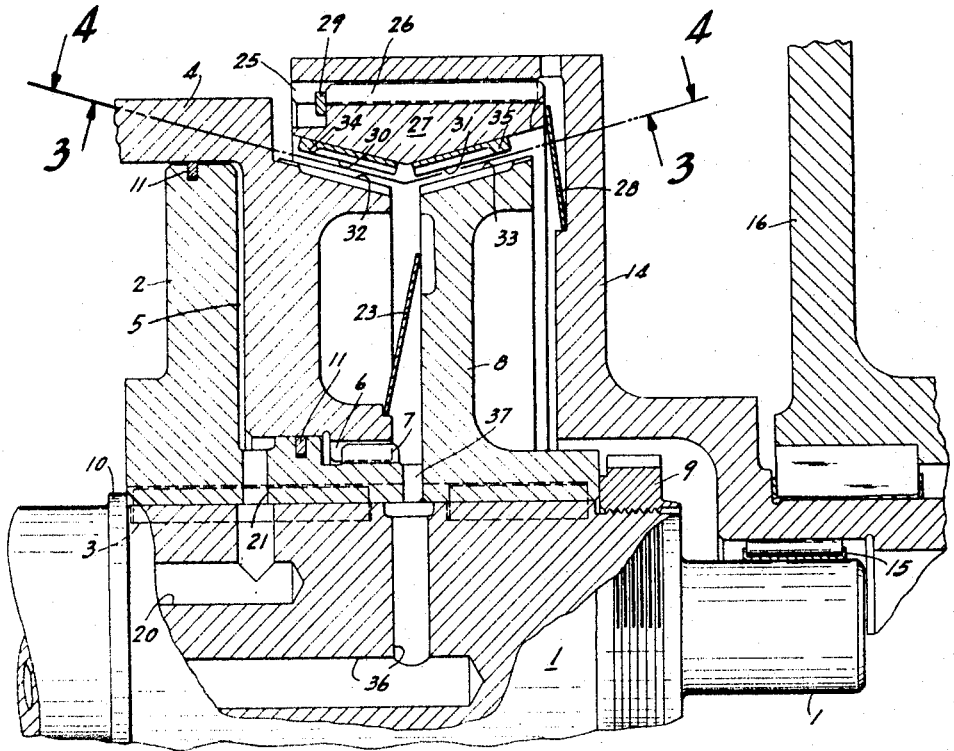
FIGURE 1 is a longitudinal, section view through a double cone-type, friction clutch mechanism utilizing the present invention and using centrifugal feed for the coupling fluid.

In referring to the drawings, reference may be made to a drive or driven member, or to a "clutch," for convenience of description, but it will be appreciated that power can be transmitted in either direction and the invention finds utility in other mechanisms than a clutch, such as for example, a brake.

Figure 2:
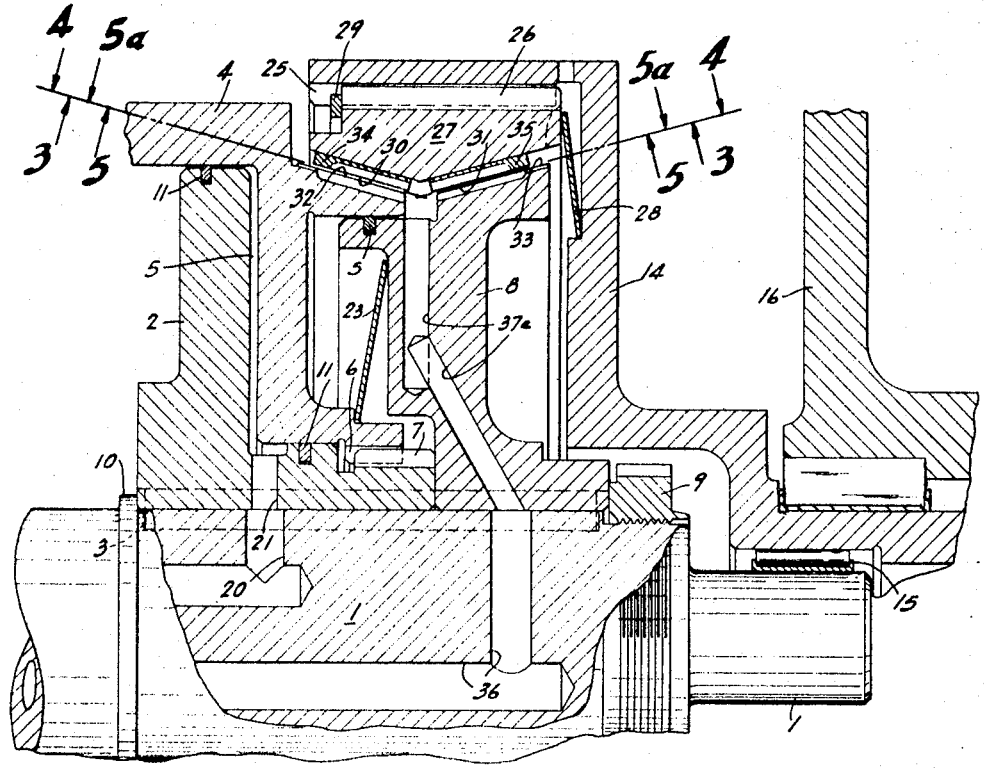
FIGURE 2 is a longitudinal, section view through a double cone-type friction clutch mechanism utilizing the present invention with a hydrostatic feed for the coupling fluid.
Figure 5:
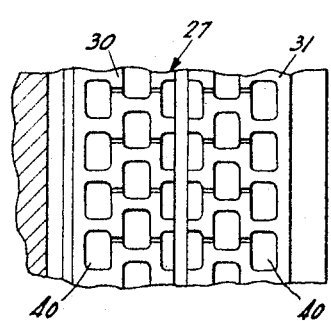
FIGURE 5 is a view similar to FIGURE 3 but showing a modification.
Figure 5A:
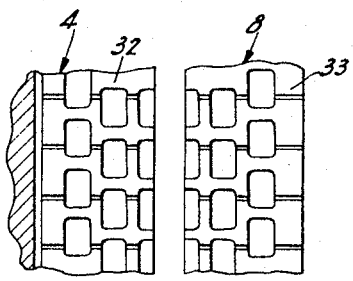
FIGURE 5a is a view similar to FIGURE 4, but showing a modification.

Referring in greater detail to the mechanism shown in FIGURES 1 and 2, the power input member in the form of shaft 1, has a reaction member 2 fixed thereon by key means 3. An axially shiftable annular housing 4 is slidable over and forms an expansible fluid chamber 5 with the fixed reaction member 2. The housing 4 is axially shiftable, but rotationally fixed, on shaft 1 by the interengaging splines 6 and 7. Backup member 8 is axially and rotationally fixed on the shaft, along with member 2, between lock nut 9 threaded on shaft 1 and shoulder 10 fixed on the shaft 1. Thus key means 3 holds members 2 and 8 rotationally fixed on the shaft. Suitable O-rings 11 or other seals are used where needed in conventional manner.

The output member, in the form of drum 14 is rotatably carried in respect to shaft 1 by the needle bearing means 15 in which the shaft 1 is piloted. A support frame 16 may surround and support the mechanism.

Fluid passage 20 in shaft 1 which may be of conventional rifle drilling construction, conducts pressure fluid from a source (not shown) and into actuating chamber 5 via passage 21 in member 2.

Pressurization of chamber 5 causes cylinder member 4 to shift to the right, as viewed in the figures, thus causing clutch engagement, as will more fully appear.

A Belleville spring 23 provides a resilient means for biasing the cylinder member 4 to the left, as viewed in the drawings, that is to the clutch disengaged position.

Drum 14 has internal splines 25 which mesh with external splines 26 of a floating, intermediate element 27 and a Belleville washer 28 urges this element 27 towards a position against the snap ring 29 carried on the internal surface of drum 14.

Intermediate element 27 has a pair of clutch cone faces 30 and 31 which are axially spaced from one another and which are engageable, respectively with clutch faces 32 and 33 of the member 4 and member 8.

Surfaces 30 and 31 are formed on sintered bronze bands 34 and 35 fixed to intermediate member 27. Thus the bronze surfaces 30 and 31 are engageable with the steel surfaces 32 and 33 for good wear resistant, frictional engaging characteristics. Alternatively, the member 27 may be made entirely of bronze.

The general operation of the above described mechanism is that as fluid pressure enters chamber 5, member 4 is urged to the right (as viewed in FIGURE 1), first causing engagement of faces 30 and 32. Continued movement to the right of member 4 overcomes the bias of spring 23, causing engagement of clutch faces 31 and 33. Such a hydraulically actuated, double cone clutch is shown generally in my U.S. Patent No. 3,324,981, which issued on June 13, 1967, or in my co-pending application, U.S. Ser. No. 539,132, filed Mar. 31, 1966, which issued as U.S. Patent No. 3,362,511 on Jan. 9, 1968, and reference may be had to those patents if deemed to be either necessary or desirable.

In accordance with the present invention, the clutch faces 30, 31, 32 and 33 are formed with fluid pockets or recesses, as will more fully appear presently, so a combined fluid coupling action occurs between opposed clutch surfaces prior to actual physical, frictional engagement of those faces. These recesses may be of different shapes and sizes, but are of such fluid capacity that the desired coupling action, to be described, takes place.

FIGURE 1 shows such an above described cone clutch, utilizing centrifugal force for feeding the coupling fluid between clutch surfaces 30 and 32 and also between clutch surfaces 31 and 33.

FIGURE 2 shows a device similar to the device of FIGURE 1, as described above, but which utilizes a pressurized, or hydrostatic feed of coupling fluid to the surfaces 30 and 32, and also between surfaces 31 and 33. A fluid seal s is provided between cylindrical surfaces of members 4 and 8 to prevent fluid from passing therethrough and instead causing the fluid to flow over the clutch faces.

In the embodiment of FIGURE 1, fluid is introduced via passage means 36 in shaft 1, from an external source (not shown), through port 37 in the hub portion of member 2, where it is then thrown by centrifugal force into the adjacent ends of the recesses 40 and 41 formed in surfaces 30, 31 and 32, 33 respectively.

In the FIGURE 2 arrangement, the fluid is forced under pressure through port means 37a and into the inner, adjacent ends of the recesses. Fluid leaves via exit passages 41a in the male member. By having the exit grooves in the male member of a cone clutch instead of in the female member, retention of at least some fluid across the interfaces is assured.

Figure 3:
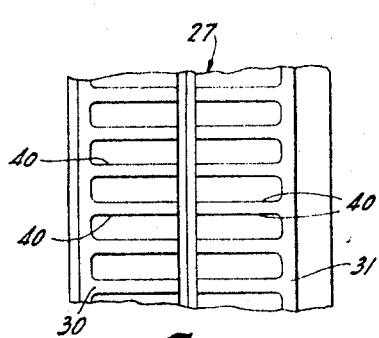
FIGURE 3 is a sectional view taken along line 3—3 in FIGURE 1 or 2.
Figure 4:
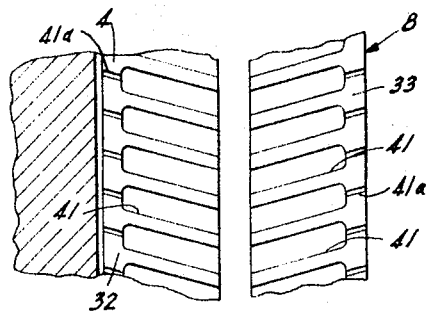
FIGURE 4 is a view along line 4—4 in FIGURE 1 or 2.

Referring to FIGURES 3 and 4, the recesses 40 and 41 may be of various shapes, but they must have sufficient fluid capacity to cause the necessary coupling action. The fluid flows through these recesses in a restricted manner due to the small bleed passage 41a at the outer ends of the recesses 41. These outlets have been shown as being in the male member, so that it will assure that fluid will be present across the interfaces because it will not readily escape. In other words, if the outlets were in the female member, the centrifugal force would throw the fluid out of the exits in the female member and completely drain the interfaces.

It will be noted that recesses 41 are formed at an angle to the longitudinal axis of the clutch. By making the recesses at an angle, in either one or the other of the male or female members, the unit pressure on the interfaces will be constant or uniform.

Due to the relative speed between the two recesses surfaces of the clutch members, the fluid is caused to circulate between the members, that is it circulates back and forth between the two members, thus causing a fluid coupling drive therebetween.

FIGURES 6 to 8 show a single cone type mechanism having a male clutch member 50 and a female clutch member 51, which members have relative axial movement in the known manner to cause engagement and disengagement of their clutch surfaces 52 and 53, respectively. This modification shows the centrifugal force feed type for the coupling fluid, which fluid is caught by pocket 54 and then enters ports 55 where it fills and flows in each direction in recesses 56 and 57 formed in surfaces 52 and 53 respectively. The fluid eventually flows out the restricted outlet passages 56a.

In FIGURES 1 and 2, the clutch is shown in the disengaged position; when the clutches are engaged, however, the outer ends of recesses 40 and 41 are in alignment and only outlets 41a permit fluid to escape.

FIGURES 9 to 11, inclusive, show the invention as applied to a single cone type clutch having a male clutch member 60 axially engageable with a female clutch member 61. Members 60 and 61 have recesses 62 and 63, respectively, formed in their engaging surfaces 64 and 65. Additionally, surface 65 has an annular feed groove 66 formed around its periphery which feed fluid evenly to the recesses 62 and 63, from the passage 68 formed in male member. The fluid passes generally axially from one recess to the next by the interconnecting passages 69 and also back and forth between recesses 62 and 63 to create the pumping action to cause clutch engagement. Eventually the fluid passes out the exit passages 62a at each side of the male member.

FIGURES 12–14

This embodiment of the invention relates to a flat, plate type clutch. A power input shaft 101 is journalled in frame 102 by antifriction bearing means 103, and a power output drum 104 is journalled on anti-friction bearing means 105 on shaft 101.

Figure 12:
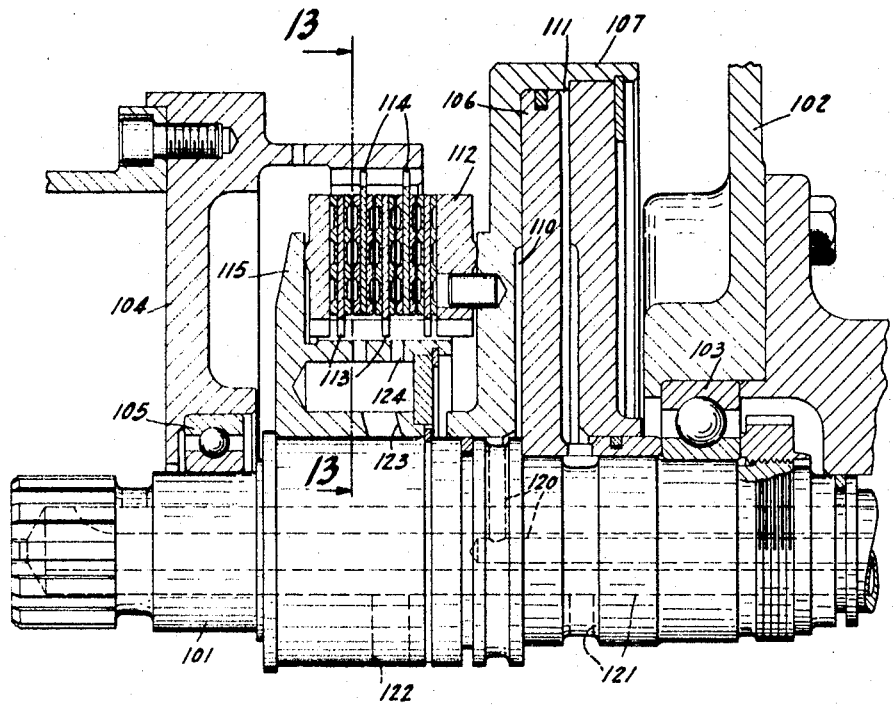
FIGURE 12 is a longitudinal view of a hydraulically actuated flat friction plate type clutch utilizing the present invention.

A fixed reaction member 106 is mounted on shaft 101 and axially shiftable, annular housing 107 is slidably mounted on the shaft 101 and surrounds the reaction member 106 over which it sealingly slides. Thus an expansible clutch actuating chamber 110 and a clutch releasing chamber 111 are defined by the reaction member 106 and housing 107. Pressurization of chamber 110 causes the housing to shift to the left (as viewed in FIGURE 12) pushing its associated pressure plate 112 against the interleaved clutch plates 113 and 114, for clamp up against the back-up hub 115 fixed on shaft 101.

The plates 113 and 114 are conventionally splined, respectively, on the hub 115 and drum 104.

Fluid passages 120 and 121 conduct fluid to and from their respective expansible fluid chambers 110 and 111, for actuation of the clutch in the known manner.

Fluid passages 122, 123, and 124 conduct fluid to the plates 113, 114 where it then flows generally radially outwardly therebetween, as will more fully appear.

Figure 13:
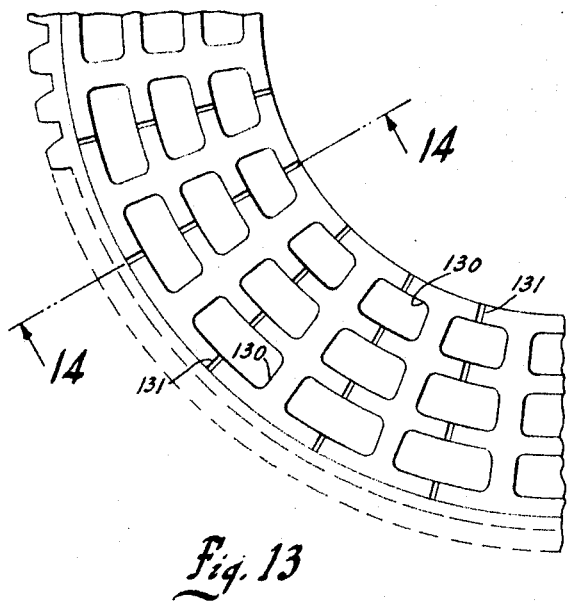
FIGURE 13 is a view taken along line 13—13 in FIGURE 12.
Figure 14:
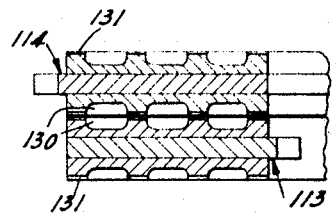
FIGURE 14 is a sectional view taken along line 14—14 in FIGURE 13.

As shown in FIGURES 13 and 14, the flat clutch plates 114 have recesses 130 formed in their faces. These recesses are connected together by relatively small interconnecting grooves 131 which causes fluid to flow evenly, in a radial outward direction and into the recesses, for ultimate exit at the periphery of the plates. The pockets or recesses 130 are sufficiently large to cause the desired fluid coupling action, and as in the previous embodiment, the fluid circulates back and forth between the recesses of adjacent surfaces, due to the difference of rotational speed of the plates 113 and 114.

GENERAL

In respect generally to the various modifications shown in the drawings, it will be appreciated that the various shapes of recesses can be used in either the cone of flat plate type of clutches, either forced or centrifugal feed may be employed in either type, or various forms of distributing grooves for the recesses may be used in the different embodiments. In any event, the fluid capacity of the opposed recesses is sufficient to cause the necessary circulation of fluid between the recesses of adjacent surfaces so that the fluid coupling action takes place before the surface comes into physical friction contact with one another.

In this combined friction clutch and fluid coupling, during the initial period the fluid, such as cooling oil, is introduced and flows between the friction surfaces. The relative speed between the surfaces causes a pumping action and circulation of fluid between the recesses to result in the fluid coupling action. It is in this stage that the heat of the work being done, in carrying at least part of the load, goes into the fluid. There is a transitional period then when the device passes from the fluid coupling, hydrokinetic realm, and into physical frictional engagement and the "asperity" realm or more positive drive between the elements.

What is claimed is:

1. Power transmitting mechanism having a drive member and a driven member, relatively shiftable friction clutch elements connected to said drive and driven members, each element having engaging friction surfaces for connecting said drive and driven members together when engaged, means for causing relative shifting movement of said elements, said surfaces each having fluid recesses formed therein for containing fluid, the recesses of one element being opposed to the recesses of an adjacent element to thereby provide fluid circulation and a consequent fluid coupling action between the recesses of the adjacent surfaces, said recesses extending only partially through any one of said elements in a direction opposite to the adjacent element, and passage means for conducting fluid to said recesses and exit passages formed in at least some of said surfaces and being smaller than said recesses for bleeding fluid therefrom.

2. Mechanism as defined in claim 1 further characterized in that said recesses comprise a plurality of individual recesses extending generally radially across the width of the surfaces, said individual recesses being connected together by smaller fluid passages.

3. Mechanism as defined in claim 1 further characterized in that the recesses formed in one of said surfaces are elongated and extend at an angle to the longitudinal axis of said mechanism.

4. Mechanism as defined in claim 1 including fluid passage means for introducing fluid under pressure to said surfaces.

5. A pressure fluid operated friction clutch having a drive member and a driven member, friction clutch elements connected to said drive and driven members and each having engaging friction surfaces for disengagingly connecting said drive and driven members together, hydraulically actuated means for causing relative movement between said elements to cause physical engagement thereof, said surfaces each having recesses formed therein for containing fluid, the recesses in the surfaces of one element being opposed to the recesses in the other element to permit circulation between the recesses of the elements, said recesses extending only partially through any one of said elements in a direction opposite to the adjacent element, passage means in said mechanism for conducting fluid to said recesses during periods of physical non-engagement whereby a fluid coupling action is obtained by circulation of fluid between the recesses of adjacent surfaces, and exit passages formed in at least some of said surfaces and being smaller than said recesses for bleeding fluid therefrom.

6. Mechanism as defined in claim 5 further characterized in that said recesses comprise a plurality of individual recesses extending generally radially across the width of the surfaces, said individual recesses being connected together by smaller fluid passages.

7. Mechanism as defined in claim 5 further characterized in that the recesses formed in one of said surfaces are elongated and extend at an angle to the longitudinal axis of said mechanism.

8. Mechanism as defined in claim 5 including fluid passage means for introducing fluid under pressure to said surfaces.

9. A friction cone clutch mechanism having a drive member and a driven member, cone clutch elements connected to said drive and driven members and each having engaging friction surfaces for connecting said drive and driven members together, hydraulically actuated means for causing relative movement between said elements to cause physical engagement thereof, said surfaces having recesses formed therein for containing fluid, and passage means for conducting fluid to said recesses when said elements are not physically engaged whereby a fluid coupling action is obtained by circulation fo fluid between the recesses of adjacent surfaces.

10. A cone clutch mechanism as set out in claim 9 including male and a female friction clutch elements, said male element having fluid exit passage connected to said recesses for bleeding thereof.

References Cited

UNITED STATES PATENTS

| | | | |
|---|---|---|---|
| 2,808,140 | 10/1957 | Trofimov | 192—57 |
| 2,879,872 | 3/1959 | Van Ranst. | |
| 3,063,531 | 11/1962 | Aschauer. | |
| 3,073,424 | 1/1963 | Russell. | |

CARLTON R. CROYLE, Primary Examiner

ALLAN D. HERRMANN, Assistant Examiner

U.S. Cl. X.R.

188—86, 264; 192—113